May 5, 1959 — W. D. FULLER — 2,885,590
CORRELATION SYSTEM
Filed July 20, 1953 — 3 Sheets-Sheet 1

INVENTOR.
WILLIAM D. FULLER
BY
F. D. Copeland Jr.
AGENT

May 5, 1959

W. D. FULLER 2,885,590

CORRELATION SYSTEM

Filed July 20, 1953

INVENTOR.
WILLIAM D. FULLER

BY

F. D. Copeland Jr.
AGENT

United States Patent Office 2,885,590
Patented May 5, 1959

2,885,590

CORRELATION SYSTEM

William D. Fuller, Garland, Tex., assignor to Engineering Laboratories, Inc., Garland, Tex., a corporation of Delaware Application July 20, 1953, Serial No. 369,027

1 Claim. (Cl. 315—1)

This invention relates generally to electronic circuits and more specifically to a circuit which depends upon the reception of specific signals for its operation.

The primary object of this invention is to provide an electronic circuit which functions to deliver an output only when two identical pulses are correlated within the circuit.

Another object is to provide a circuit which may be activated by a second pulse entering the circuit a specified time interval after the first pulse enters.

A further object is to provide a correlation system which includes a novel correlator circuit which functions only in response to an input of multiple electrical pulses which have a predetermined separation time.

Other objects and advantages of the invention will become apparent from the following description, and for the purposes of illustration, but not of limitation, embodiments of the invention are shown in the accompanying drawings in which:

Fig. 3 represents a circuit diagram of a typical delay section of the correlator system.

Fig. 4 represents voltage time graphs of the signal taken at various points within the correlator system.

Figure 1:
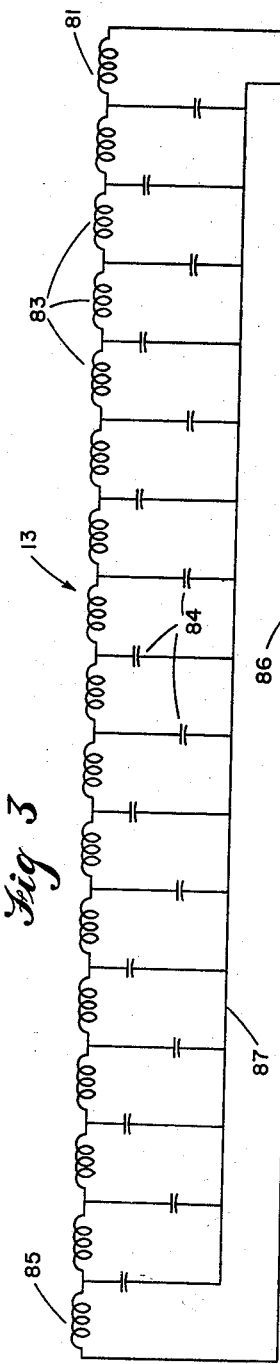
Fig. 1 represents a block diagram of the novel correlation system using a correlator circuit of this invention.

Referring now more particularly to the characters of reference of this invention, in block diagram Fig. 1, the operation of the correlator system of this invention may be observed broadly. An incoming signal T divides at point 11 and an equal voltage signal $T_1$ and $T_2$ goes into each branch of the parallel circuit including correlator 12 and delay network 13 respectively. The signal $T_1$ going into the top correlator branch of the circuit is not sufficient of itself to produce an output to satisfactorily operate an electrical apparatus which, in this instance, is shown to be a cathode ray tube 14 to which this circuit is shown connected for purposes of illustration. Signal $T_1$ is composed of multiple pulses $P_1$ and $P_2$ having a separation rate of D seconds. The signal $T_2$ passing through the lower branch is composed of pulses $P_3$ and $P_4$. Graphs showing amplitude versus time are shown in Fig. 4 and may be used to illustrate the general function of this device. After signal $T_1$ has passed through amplifier 15 it arrives at correlator 12 in wave form shown at Fig. 4-(a). However signal $T_2$ has been delayed by a time increment exactly equal to the separation rate D, so that after passing through delay network 13 and amplifier 16 it arrives at the correlator 12 in the wave form shown at Fig. 4-(b). In correlator 12 wave forms (a) and (b) are combined in such a way that the output signal $T_3$ which is delivered to amplifier 17 and cathode ray tube 14 has a wave form shown at Fig. 4-(c) and includes a pair of negligible pulses $P_5$ and $P_7$ surrounding a pulse $P_6$ of relatively large amplitude.

Figure 2:
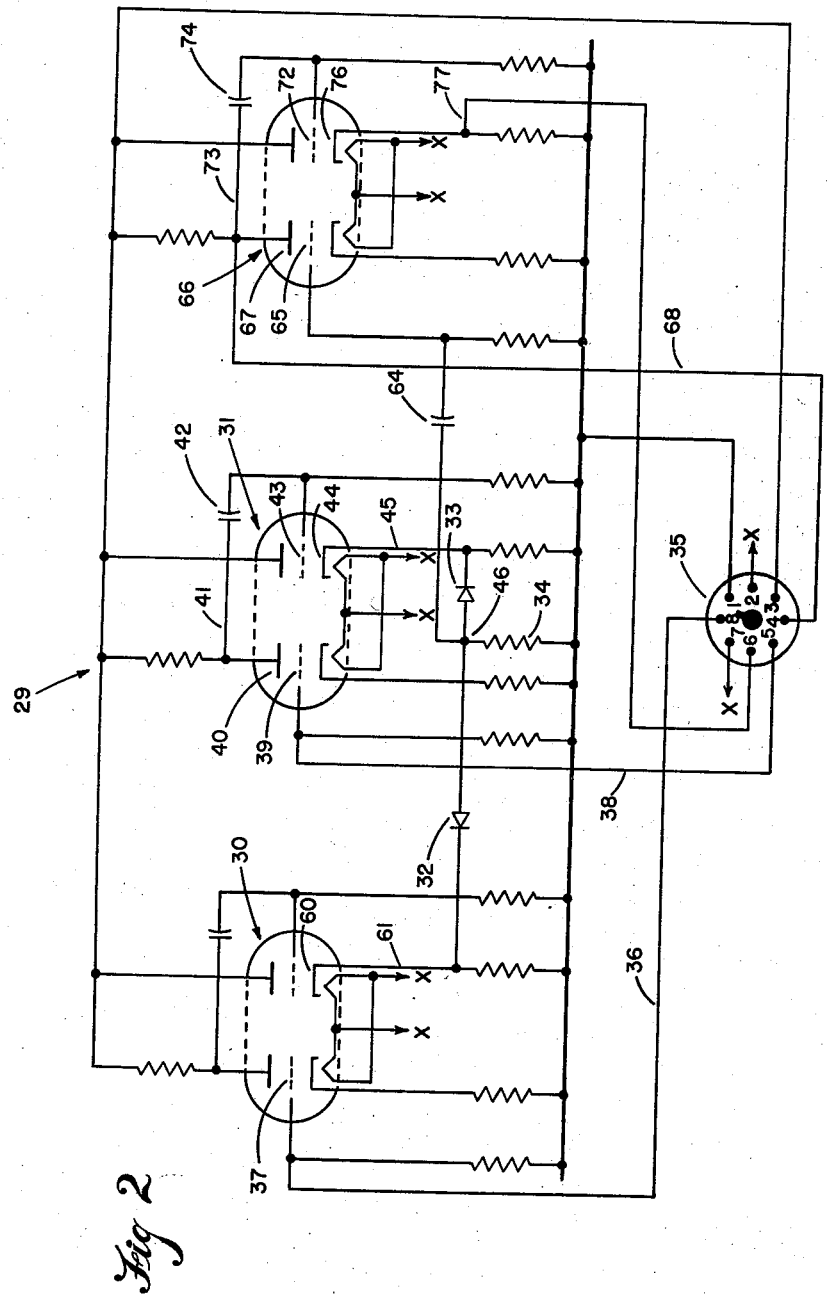
Fig. 2 represents a circuit diagram of the amplifier section of this system including the correlator circuit itself.

The correlator-amplifier unit circuit 29 as shown in Fig. 2 includes tubes 30 and 31 connected through a circuit including rectifying diodes 32, 33, and a high resistance 34. The direct input signal $T_1$ to the correlator-amplifier unit 29 comes in at pin 8 of socket 35 and by way of lead 36 to grid 37 of tube 30, while the delayed input $T_2$ from delay network 13 comes into the circuit by way of pin 5, lead 38, and grid 39 of tube 31. Delayed signal $T_2$ is amplified at one triode section of tube 31 and by way of plate 40, lead 41, capacitor 42 and grid 43, is further amplified in the second section of tube 31. The output of the second section is taken from cathode 44, lead 45, and passes through diode 33 to a junction identified as 46. Since the time that delayed signal $T_2$ was in network 13 is equal to the separation rate of successive pulses $P_1$ and $P_2$, pulse $P_3$ of signal $T_2$ appears at junction 46 at the same instant that a second pulse $P_2$ of initial signal $T_1$ has passed through tube 30 and from cathode 60, lead 61, and diode 32 and also reached junction 46, whereat signals $T_1$ and $T_2$ combine to form $T_3$ and are fed through capacitor 64 to grid 65 of tube 66. The output of one section of this final stage amplifier tube 66 is taken from plate 67 and through lead 68 is delivered to pin 4 of socket 35, wherefrom it may be delivered to an electrically operated apparatus such as cathode ray tube 14.

The output from plate 67 is also amplified in the second section of tube 66 and is introduced to grid 72 through lead 73 and capacitor 74. The output of this section is taken from cathode 76 and through lead 77 is delivered to pin 6 of socket 35, from which the output may be used to operate any auxiliary electrical apparatus such as a head set (not shown).

The B+ power supply for all plates of tubes 30, 31, and 66 is taken from pin 3 of socket 35, and the filament supply is taken from pins 2 and 7.

The delay network 13 may be examined in greater detail by reference to Fig. 3. Socket 80 receives signal $T_2$ by way of pin 4 and delivers this signal to the input inductor 81 by way of lead 82. The delay circuit is composed of a multiplicity of equal inductors 83 in series, and a multiplicity of capacitors 84 connected in parallel. The output inductor 85 connects to pin 8 of socket 80 by way of lead 86. A common ground lead 87 attaches to pin 1 of socket 80 from whence it is externally grounded. The sum of the individual time delays that signal $T_2$ experiences in each inductor-capacitor section of this circuit add up to the total delay D which equals the separation rate of pulses $P_1$ and $P_2$.

Figure 5:
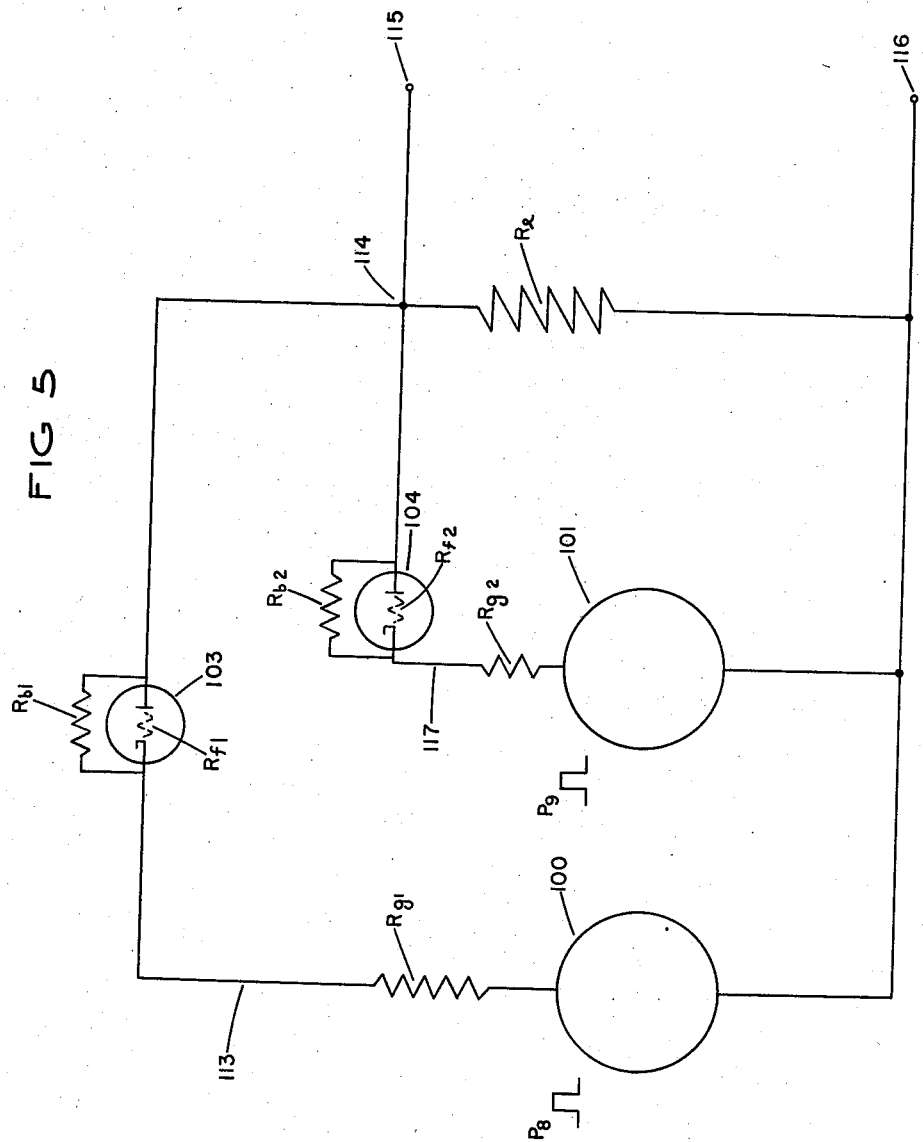
Fig. 5 represents a simplified embodiment of one portion of this invention which is useful in explaining the basic theory of operation of the complete invention.

By reference to Fig. 5 the basic theory of operation of this invention may be observed. In this simplified embodiment the pulses $P_8$ and $P_9$ are delivered by pulse generators 100 and 101. The internal resistances of these generators is indicated at $Rg1$ and $Rg2$. Pulse generator 100 is connected to a load resistor R2 through a shunted diode 103. The second pulse generator 101 is connected to the common load resistor R2 through a second shunted diode 104. Shunt resistors $Rb1$ and $Rb2$ are of a much larger magnitude than the internal resistance indicated at $Rf1$ and $Rf2$ as they represent the shunting resistance of their respective diode tubes 103 and 104. Internal resistances $Rf1$ and $Rf2$ are operative only in the forward direction that the diodes normally conduct current, since the resistance in the opposite direction in this case would be infinite. The relative values of the resistances in this circuit are such that load resistor R1 is equal to or greater than shunt resistors $Rb1$, $Rb2$ and is much greater than the sum of internal resistance as in one case and the internal resistance $Rg1$ of the corresponding generator; the latter resistances $Rf1$ and $Rg1$ being of the same order of magnitude.

The operation of this correlation system when only one generator 100 emits a pulse $P_8$ which causes a current flow along path 113 to junction point 114 may be examined by reference to Fig. 5. In this path the current encounters resistance $Rg1$ and since resistance $Rf1$ will not pass current in this direction to junction point 114, the path to this point is through shunt resistor $Rb1$. Upon reaching junction point 114 the bulk of the current will take the path of lower resistance which in this case will be through internal forward resistance $Rf2$ and resistance $Rg2$. A very small current would divide at point 114 and create a small voltage drop across R1, which would be equal to the voltage drop due to the larger current passing through the small resistances $Rf2$ and $Rg2$, and this IR drop represents the output voltage at terminals 115, 116.

The operation of this circuit when both generators 100 and 101 are emitting simultaneous pulses $P_8$ and $P_9$, will be that current flows along paths 113 and 117 to junction point 114 and the currents at this point are additive so that with the proper ratio of resistances the total voltage available at terminals 115, 116 will approximately equal the voltage output of either generator.

The relationship between the output voltage to a single pulse voltage when the resistance values are properly selected may be shown by assigning certain arbitrary values to electrical elements of the circuit. For example if $Rg$ and $Rf$ relative to both paths are equal to .5 ohm and $Rb$ is 1000 ohms, the output voltage may be determined by Ohm's and Kirchhoff's laws to be on the order of $1/1000$ of the initial pulse voltage, which is for the purposes of operating external electrical apparatus of a negligible or unusable value. If R1 is much larger than the other values, say on the order of 100,000 ohms it may be neglected in the above calculations.

With the above mentioned values, the output voltage when the generators are emitting simultaneous pulses may be shown to be approximately 99% of the initial pulse voltage.

An additional advantage is obtained when this system is employed with a cathode ray tube which has a long persistence phosphorescent face surface. If signals T appear in repeated pulse groups having a repetition time on the order of fractions of a second and the persistence time of the tube fact is several seconds, a plurality of received signals will be additive on the tube face so that increased brilliancy of a time duration sufficient for visual inspection will occur when pulses of the correct signal are displayed, but random pulses will be further minimized in their visual display.

From the foregoing description it will be readily seen that there has been produced a device as substantially fulfills the objects of the invention as set forth herein.

While this specification sets forth in detail the present and preferred construction of this invention, still in practice such deviations from such detail may be resorted to as do not form a departure from the spirit of the invention as defined in the appended claim.

Having thus described the invention, what is claimed as new and useful and is desired to be secured by Letters Patent is:

An electrical correlation system for connecting a signal source of multiple spaced pulses having a predetermined separation rate to a cathode ray tube, comprising: a cathode ray tube, a long persistence phosphorescent face surface on said tube, a correlator-amplifier unit, a direct path from said source to said unit, a delay path from said source to said unit in parallel with said direct path, delay means in said delay path operative to delay that portion of said spaced pulse which enters said delay path by an integral multiple of said separation time, and means to combine said direct and delay path pulses to produce a resultant pulse of sufficient power level to momentarily illuminate the said tube face while minimizing the power level of pulses having a different separation time; said last named means comprising a correlator-amplifier unit including a direct path amplifier tube having an output cathode, a delay path amplifier tube having an output cathode, leads connecting each output cathode to a common junction point, a high resistance connecting said junction point to ground, rectifying metallic diodes in each lead to said junction point, a final stage amplifier tube, a lead from said junction point to said final stage amplifier tube, a capacitor in said last named lead, and an output lead from said final stage amplifier to said cathode ray tube.

References Cited in the file of this patent

UNITED STATES PATENTS

| | | |
|---|---|---|
| 2,211,942 | White | Aug. 20, 1940 |
| 2,266,401 | Reeves | Dec. 16, 1941 |
| 2,358,448 | Earp | Sept. 19, 1944 |
| 2,412,994 | Lehmann | Dec. 24, 1946 |
| 2,535,303 | Lewis | Dec. 26, 1950 |
| 2,549,780 | Earp | Aug. 24, 1951 |
| 2,557,729 | Eckert | June 19, 1951 |
| 2,568,265 | Alvarez | Sept. 18, 1951 |
| 2,580,148 | Wirkler | Dec. 25, 1951 |
| 2,643,819 | Lee et al. | June 30, 1953 |
| 2,657,318 | Rack | Oct. 27, 1953 |
| 2,718,638 | DeRosa et al. | Sept. 20, 1955 |